United States Patent

Maier et al.

[11] Patent Number: 5,857,555
[45] Date of Patent: Jan. 12, 1999

[54] ACTUATING DEVICE FOR TILTING A STRUCTURAL COMPONENT

[75] Inventors: Wilhelm Maier, Wettingen, Switzerland; Manfred Boller, Hohentengen, Germany

[73] Assignee: Grapha-Holding AG, Hergiswil, Switzerland

[21] Appl. No.: 721,993

[22] PCT Filed: Jan. 30, 1996

[86] PCT No.: PCT/CH96/00036

§ 371 Date: Oct. 7, 1996

§ 102(e) Date: Oct. 7, 1996

[87] PCT Pub. No.: WO96/24547

PCT Pub. Date: Aug. 15, 1996

[30] Foreign Application Priority Data

Feb. 10, 1995 [CH] Switzerland ............... 00396/95

[51] Int. Cl.⁶ .................................................. B65G 37/00
[52] U.S. Cl. ........................................................ 198/370.04
[58] Field of Search ....................................... 198/370.04

[56] References Cited

U.S. PATENT DOCUMENTS

| | | |
|---|---|---|
| 3,034,665 | 5/1962 | Speaker .................... 198/370.04 X |
| 3,265,190 | 8/1966 | Boehm . |
| 3,360,106 | 12/1967 | Harrison et al. . |
| 5,477,955 | 12/1995 | Madden et al. ............ 198/370.04 |
| 5,611,419 | 3/1997 | LaVars ..................... 198/370.04 |
| 5,632,589 | 5/1997 | Bray et al. .............. 198/370.04 X |

FOREIGN PATENT DOCUMENTS

| | | |
|---|---|---|
| 0540464 | 5/1993 | European Pat. Off. . |
| 0581728 | 2/1994 | European Pat. Off. . |
| 1546382 | 2/1990 | U.S.S.R. ................... 198/370.04 |

*Primary Examiner*—James R. Bidwell
*Attorney, Agent, or Firm*—Venable George H. Spencer; Robert Kinberg

[57] ABSTRACT

A tiltable bowl of a carriage of a sorting line is secured on two supports which are arranged axisymmetrically with respect to one another. The supports are pivotably seated on an axle. On each support, a resilient yoke is formed on one side with its first end. The oppositely disposed second end of the yoke can be displaced within defined limits relative to the supports. Each yoke has a latch cam which, in the horizontal, initial position of the bowl, locks into place behind a projection fixedly connected to the frame and thus locks the bowl in this initial position. When a pusher rod articulated at the second end is pushed upward, the lock is released first and then the bowl is tilted.

13 Claims, 8 Drawing Sheets

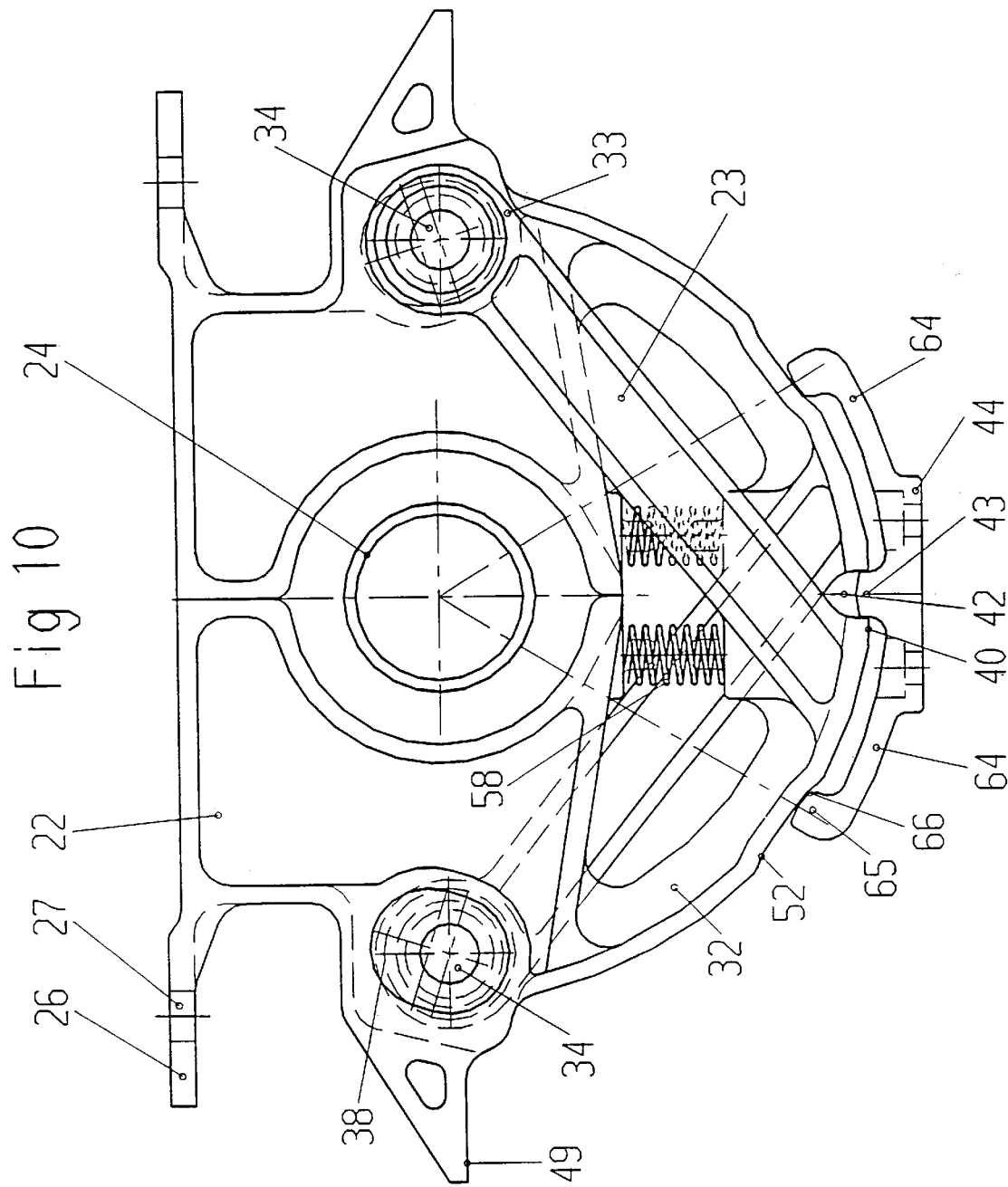

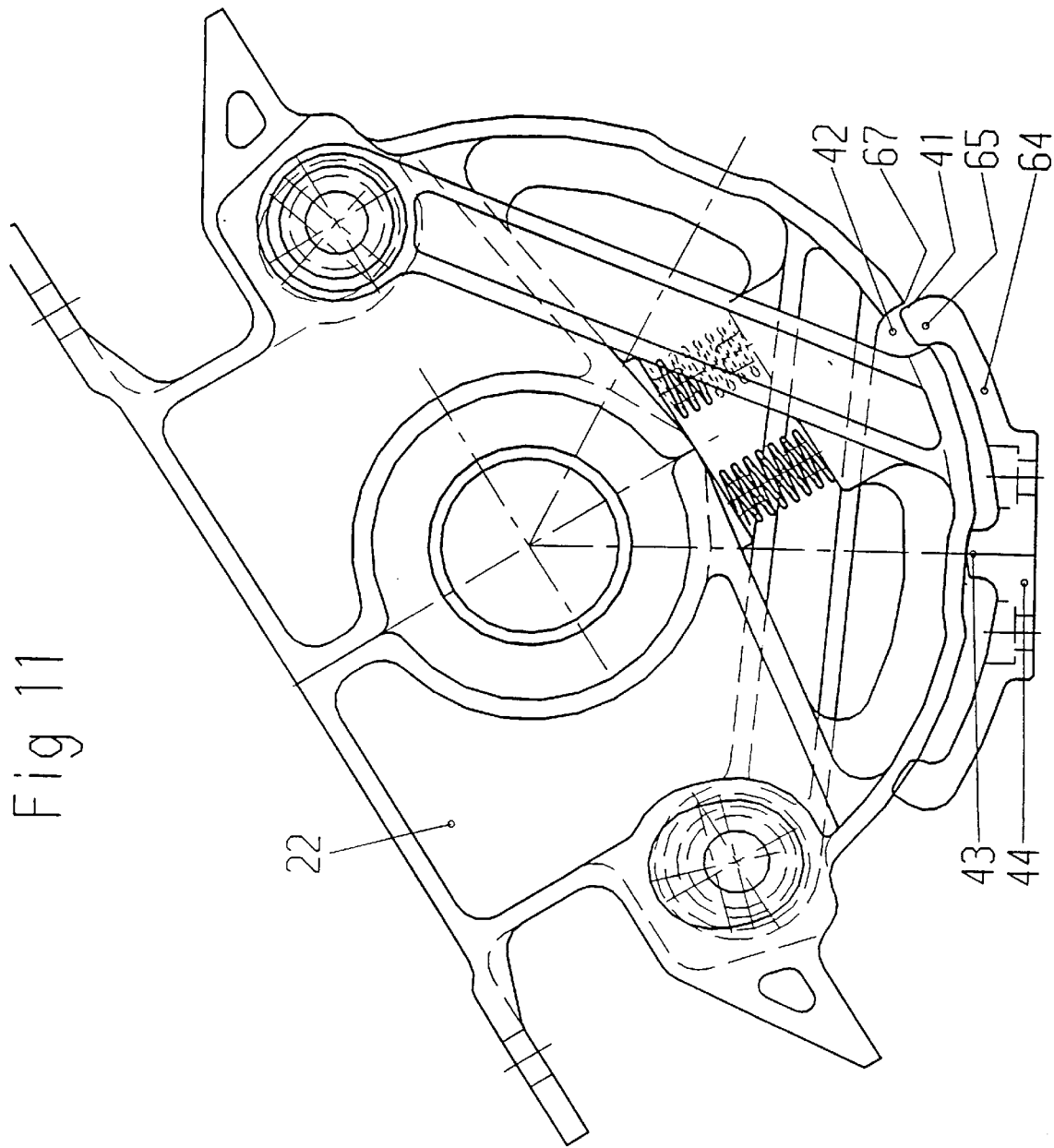

ACTUATING DEVICE FOR TILTING A STRUCTURAL COMPONENT

BACKGROUND OF THE INVENTION

From EP-A-540 464, a sorting line for piece goods is known having a plurality of carriages which are coupled together to form a carriage chain. Each carriage has a bowl for receiving the piece goods. At a selectable receiving station, the bowl can be pivoted from a locked, horizontal initial position into a tilted position by means of two pusher rods and an actuating device. When the pusher rod is actuated, the lock is released first and then the bowl is tilted. This actuating device has performed very well. But its production is expensive because many individual parts are required.

SUMMARY OF THE INVENTION

It is the object of the present invention to design a device of the type mentioned at the outset in such a manner that its production is inexpensive. The above and other objects are accomplished in the context of an actuating device for tilting a component from a locked initial position into at least one tiled position, wherein the component is seated so as to pivotable around an axle of a frame, and wherein for a tilting the component, at least one actuating rod unlocks a locking device and tilts the component, wherein according to the invention, the actuating device comprises two resilient yokes each having a first end secured to the component and a second end displaceable within defined limits with respect to the component; and a separate actuating rod articulated adjacent to the second end of each yoke, wherein each yoke includes a latch cam between the two ends and the two yokes are arranged axisymmetrically to an axis normal to a longitudinal direction of the axle, with the two cams forming a groove into which a projection fixedly connected to the frame is locked in the initial position of the component.

Further aspects and features of the invention will become apparent from the detailed description and the appended claims.

In the following an embodiment of the invention will be explained by way of the drawings. The drawings show:

FIG. 1 a side view of a carriage for a sorting line,

FIG. 2 a cross section along the line II—II in FIG. 1,

FIG. 3 a schematic representation of the mode of operation,

FIG. 4 a view of a support with yoke,

FIGS. 5–8 views and sections in the direction of the arrows V, VI or along the lines VII—VII and VIII—VIII in FIG. 4, and FIGS. 9–11 two embodiment variants of the resilient yoke.

DETAILED DESCRIPTION OF THE INVENTION

Figure 1:
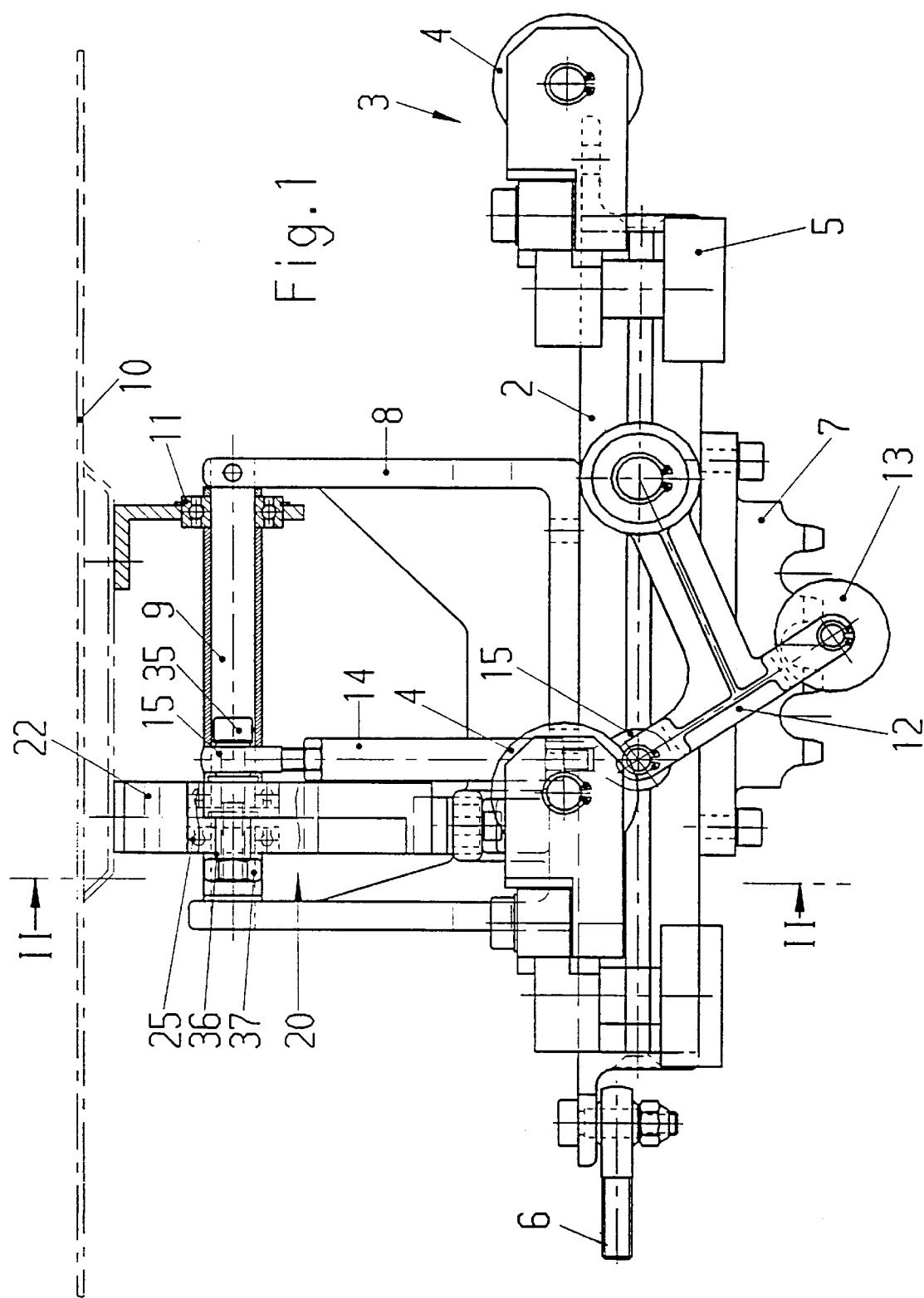
Figure 2:
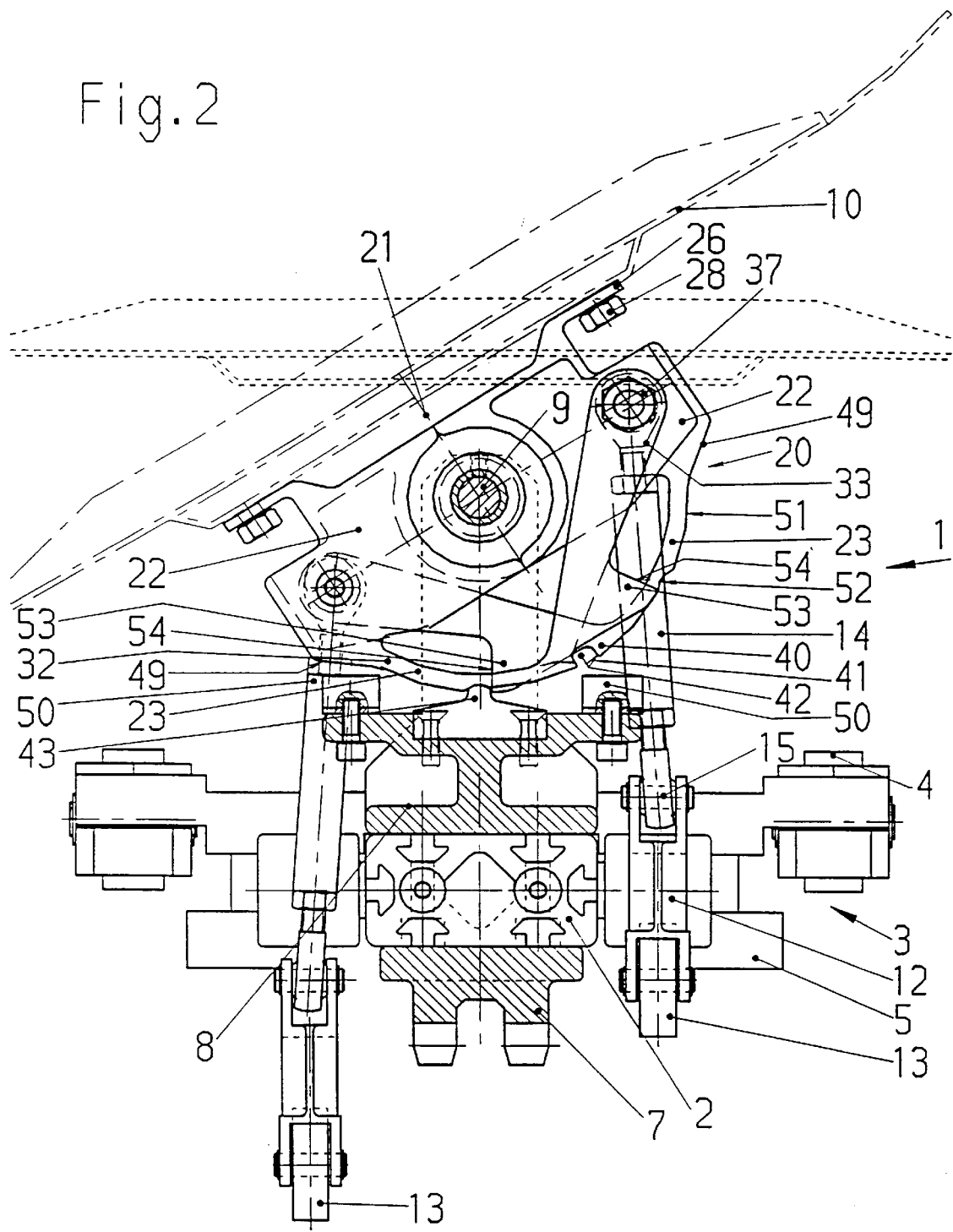

FIGS. 1 and 2 illustrate a carriage 1 of a sorting line. On a carriage body 2 is mounted a running gear 3 with running rollers 4 and lateral guide rollers 5 which run on tracks that are not shown. Adjacent carriages 1 are coupled to one another by means of joint rods 6. At the bottom, the carriage body 2 is provided with a toothed rack 7 for engagement in a circulating chain for driving the carriage chain. A U-shaped support 8 is mounted on the carriage body 2, with the support bearing an axle 9 extending in the longitudinal direction of the carriage. A bowl 10 is pivotably seated on this axle to support the piece goods by means of ball bearings 11. On the side of the carriage body 2, respectively one pivot arm 12 is seated so as to pivot. On the bottom of the arm, an actuating roller 13 is rotatably seated which runs onto a switchable cam track at the destination station of the carriage 1 and pushes a pusher rod 14 upward. The pusher rod 14 is provided with spherical bearings 15 on both sides.

Figure 3:
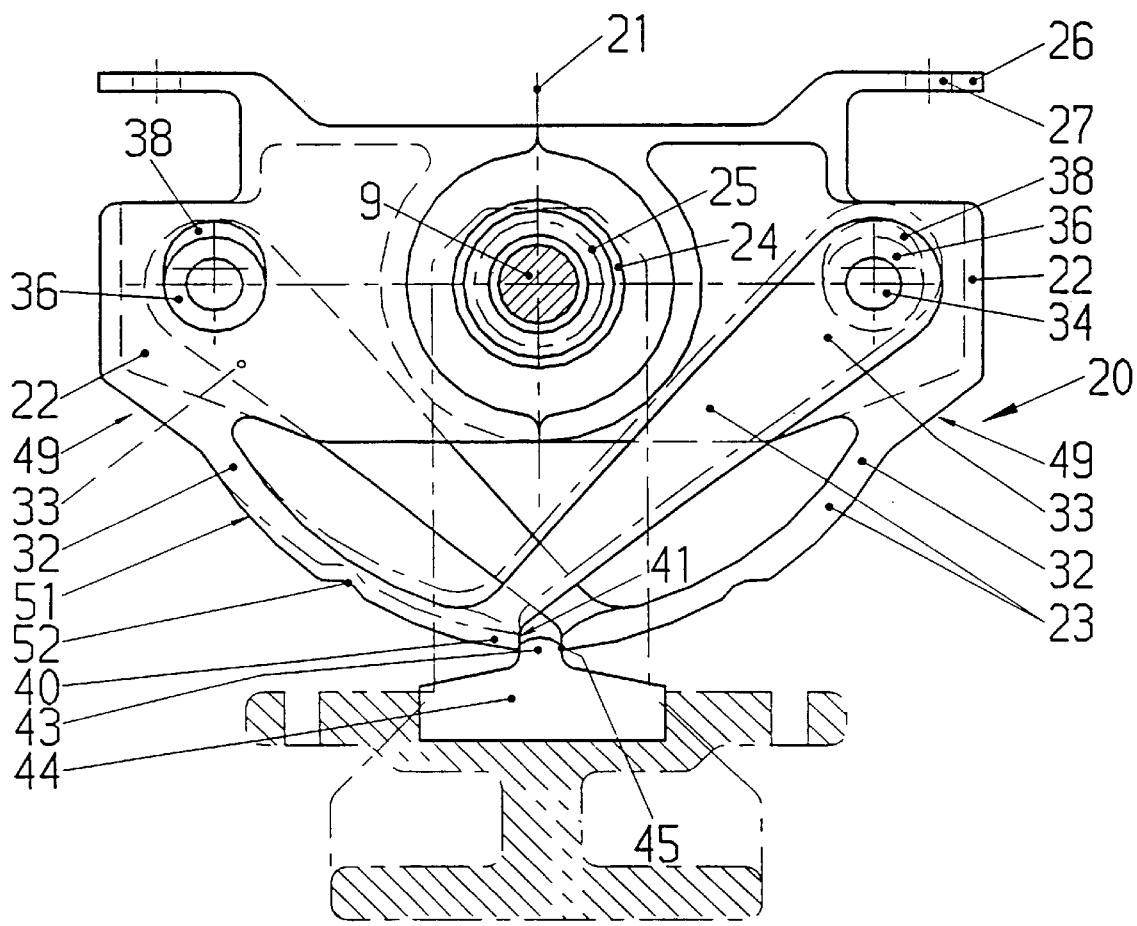
Figure 5:
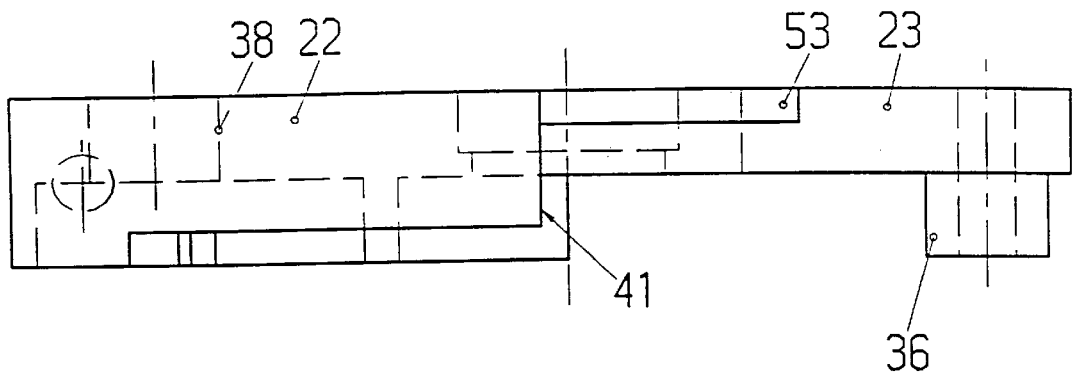

The two pusher rods 14 act on a locking and actuating device 20. The latter comprises two identical supports 22 arranged in central symmetry to a normal axis 21 through the axle 9, the supports having formed-on, resilient yokes 23 made of plastic material, preferably of polypropylene. The two supports 22 and yokes 23 are partially axially offset with respect to one another. Referring additionally to FIG. 3, in the center, the supports 22 have coaxial bores 24 into which ball bearings 25 are inserted. The bearings 25 are slid onto the shaft 9. At the top, the supports 22 have laterally projecting flanges 26 with through-bores 27. The bowl 10 is screwed to the supports 22 by way of screws 28 which are plugged through the bores 27.

On each support, the yoke 23 is formed on one side with its first end 32. On the oppositely disposed second end 33, the yoke 23 has a cylindrical through-bore 34 which extends through a cylindrical projection 36 and through which a threaded bolt 35 supporting the upper bearing 15 of the pusher rod 14 is plugged and fastened with a nut 37. The projection 36 extends through an elongated hole 38 in the other support 22, which hole extends in the height direction. In the initial position of the yoke 23, the projection 36 rests against the lower edge of the elongated hole 38, e. g. with a slight initial tension.

At the bottom, each yoke 23 has a latch cam 40 with a stop surface 41 that is vertical in the initial position. Together, the stop surfaces 41 of the two yokes 23 form a groove 42 which, in the initial position, extends around a projection 43. The projection 43 is formed on a plastic body 44 which is screwed onto the support 8. The projection 43 is cylindrical or prismatical and is provided with stop surfaces 45 on both sides against which the surfaces 41 rest in the initial position and lock the bowl 10 in the horizontal position.

If one of the rollers 13 runs onto a cam track, the respective pusher rod 14 pushes the respective yoke end 33 upward against the spring force of the yoke 23 until the projection 36 hits the upper edge of the elongated hole 38. During this process, the yoke 23 is resilient essentially adjacent to its first end 32 so that the cam 40 is lifted so as to be above the projection 43. This releases the lock, and as the rod 14 is pushed higher, the bowl 10 is tilted into its final position. In this final position, a plane surface 49 adjacent to the yoke end 32 hits a rubber buffer 50, thus smoothly braking the tilting motion with little noise.

The outer surface 51 of the yoke 23 between the stop surface 41 and the first end 32 is bow-shaped and may comprise an index notch 52 to lock the yoke 23 into place in the projection 43 in the tilted position. Thus, the tilted position is secured. In addition or instead, the yoke 23 may have a projection 53 with a stop surface 54 on the side between the stop surface 41 and the second end 33, with the stop surface being disposed approximately in a plane which comprises the axle 9 and being oriented in the same direction as the surface 41. In this case, the projection 53 of the actuated yoke 23 locks into place in the tilted position behind the projection 43 so that the bowl 10 is locked in the tilted position.

To return the bowl 10 into the initial position, the lowered actuating roller 13 runs onto, for example, a fixed cam track.

The respective yoke 23 again yields resiliently so that the projection 53 is lifted so as to be above the projection 43, which means that the lock is released and the bowl 10 is returned to its initial position as the roller 13 is lifted further; in the initial position, the two latch cams 40 lock into place at the projection 43 and lock the bowl 10.

The index notch 52 and the projection 53 may, however, also be eliminated and the outside surface 51 can be configured such that the portion of the yoke 23 between the latch cam 40 and the first end 32 progressively yields resiliently during the tilting of the bowl 10. In this case, the bowl 10 can automatically pivot back from the tilted position into the initial position as soon as the respective actuating roller 13 runs away from the respective cam track.

The region of progressive resilient yielding may, however, be limited to the latch cam 40 in the immediate vicinity of the stop surface 41 so that the automatic pivoting back into the locked initial position is limited to an angular region of, e. g., 20° to 100°. Then the outer surface 51 is slightly spiral-shaped adjacent to the surface 41, with the distance from the pivot axis increasing as the distance from the surface 41 increases.

If the bowls 10 only have to be tilted to the one side, that is, if all destination stations are arranged on the same side of the carriage chain, the device can be simplified accordingly in that only one support 22 with yoke 23 is installed and the second stop 41 is fixedly formed on this support 22.

Figure 9:
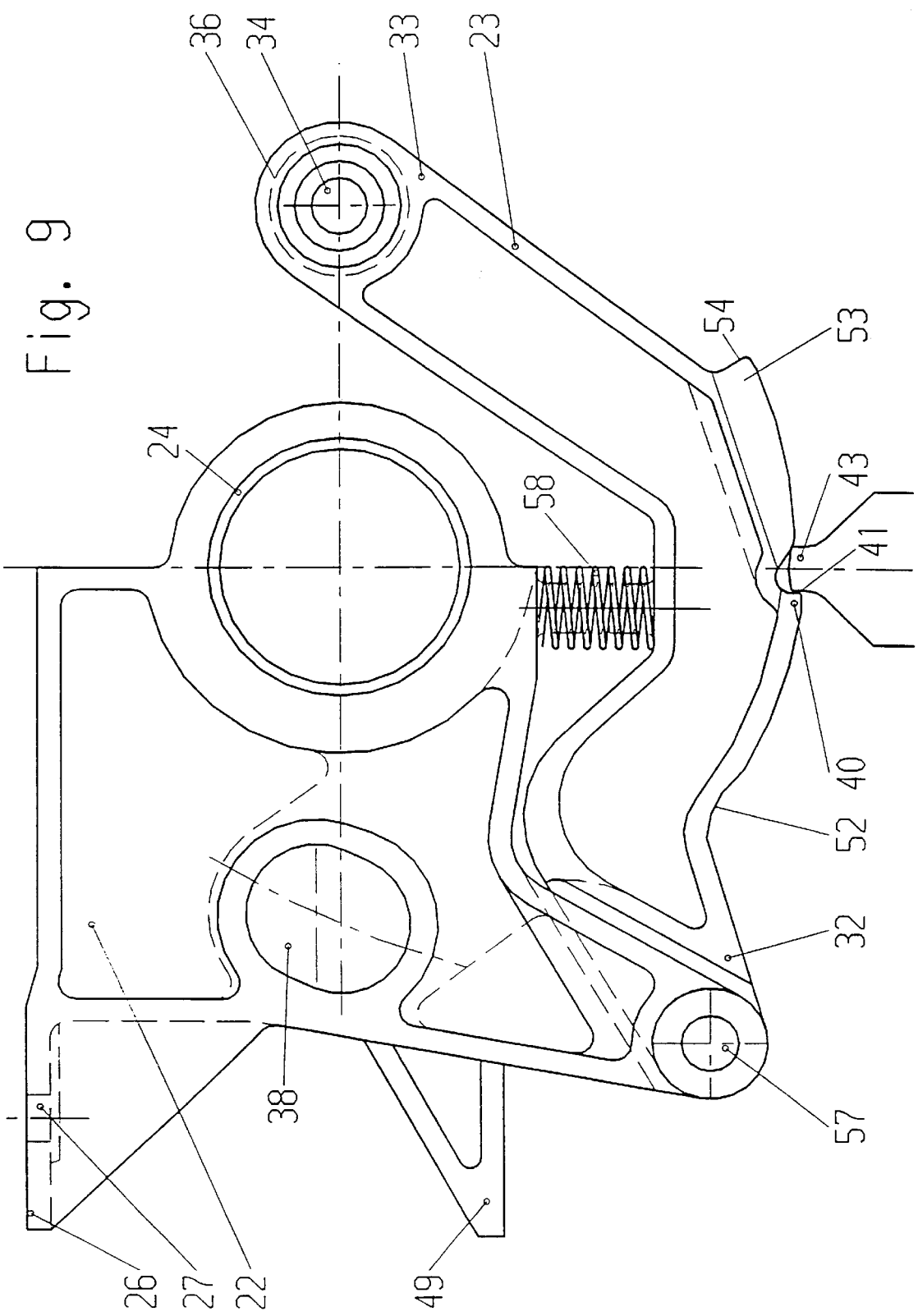

In the embodiments according to FIGS. 9 and 10, analogous parts are identified by identical reference numerals so that a detailed description of these parts is not necessary.

The embodiment according to FIG. 9 differs from the one according to FIGS. 1–8 in that the resilient yoke 23 is flexibly connected at its first end 32 with the respective support 22 by means of a journal 57 and is pretensioned downward by a spring 58, i.e., in the direction of projection 43. The spatial position of the journal 57 is selected such that the lock between the stop surface 41 and the projection 43 is reinforced if heavy loads act on the bowl 10 on one side. For this purpose, the normal to the plane of the stop surface 41 extends through the axis of the journal 57 above the projection 43. But in order to keep the force required for the release small, even for heavy, one-sided loads, the journal 57 is disposed only slightly above the projection 43 in the initial position. This variant has the advantage that the initial tension of the spring 58 may be selected at any magnitude and does not wane because of creeping of the material. Additionally, larger pivot angles of the yoke 23 can be accomplished without excessive material stress, that is, a reliable blocking in the initial position. A further advantage is that the materials can be optimally adapted to their function. For example, a very rigid material can be selected for the support 22, but a very wear-resistant material for the yoke 23, particularly POM ("Delrin"), with the projection 43 advisably being made of PA6.6 in this case.

In this variant, a single continuous support may be provided instead of two axisymmetrically arranged supports 22. The two-component solution, however, has the advantage that the injection molding tool is smaller and better used to capacity.

As is shown in FIGS. 10 and 11, the spring 58 may also be used in the embodiment according to FIGS. 1–8. This offers the advantage that the resilient yoke 23 formed on the support 22 can be configured to have soft spring characteristics to bending in the region of its first end 32 and is therefore stressed little during deflection, while still accomplishing a reliable locking in place in the initial position.

Figure 4:
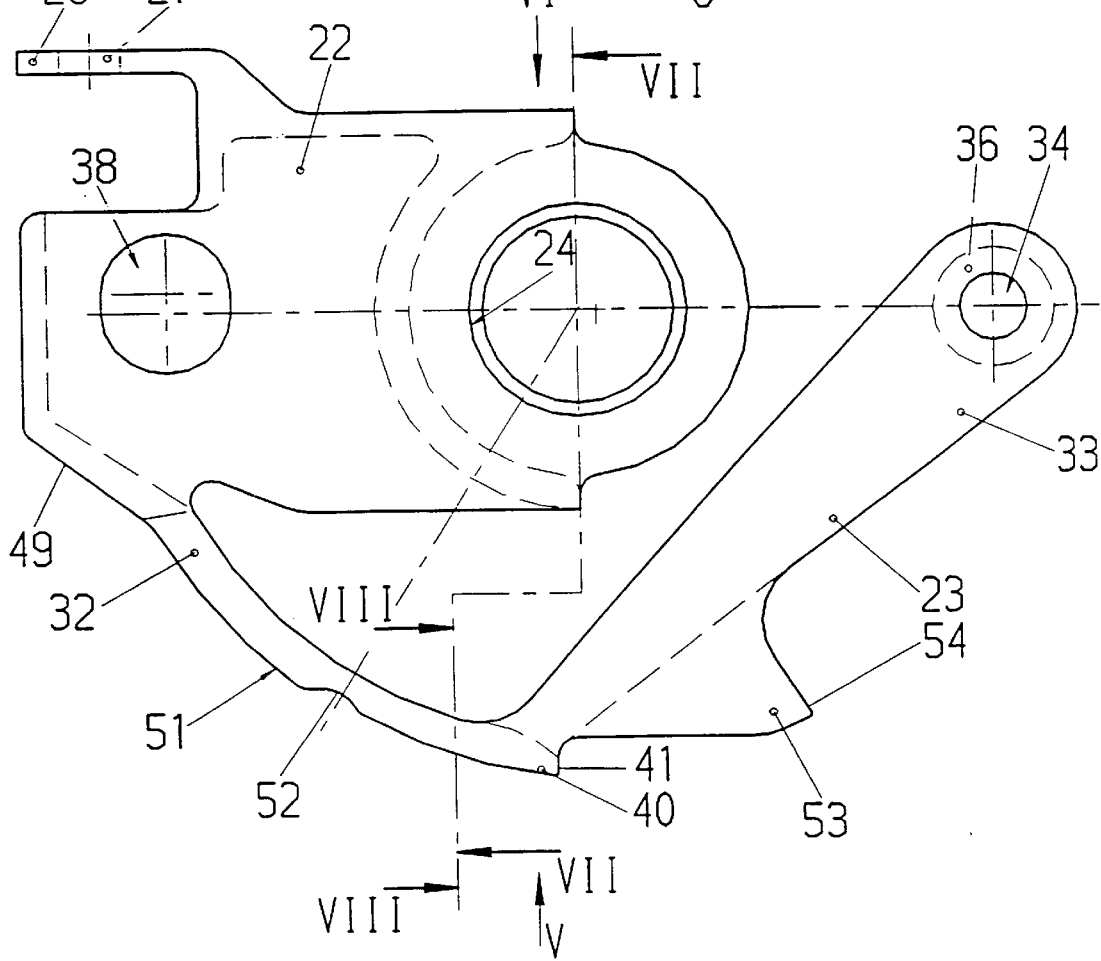
Figure 6:
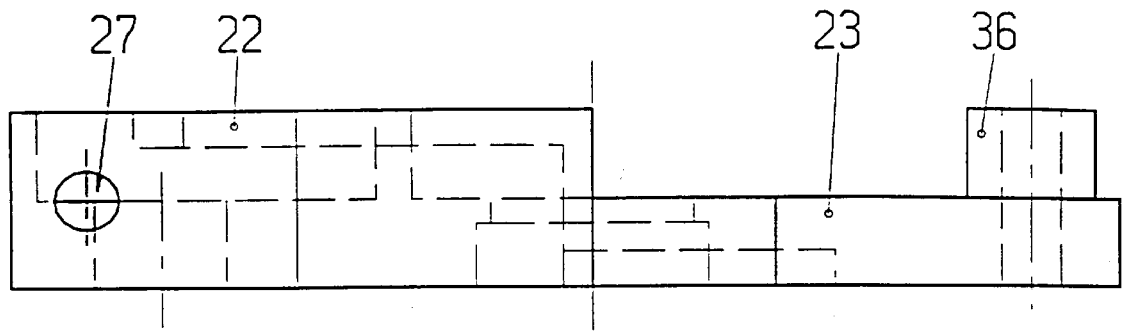
Figure 7:
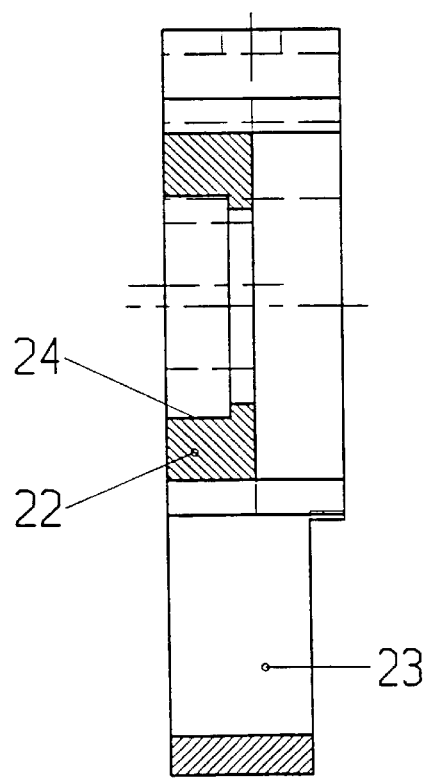
Figure 8:
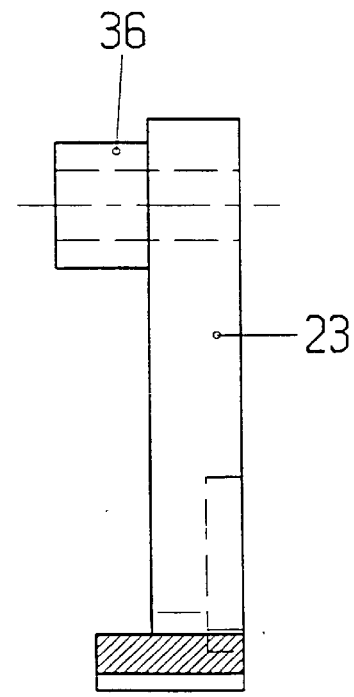

In the embodiment according to FIGS. 10 and 11, the plastic body 44 with the projection 43 is provided on both sides with one resilient extension 64 each having a cam 65 at the free end which locks into place in the respective index notch 52 in the initial position (FIG. 10). During this process, it rests against a run-on surface 66 of the index notch 52 forming an acute angle with the radial direction. In this manner the support 22 is additionally spring-centered in the initial position so that a slight play of the projection 43 in the groove 42 does not have a negative effect. In the tilted position (FIG. 11), the one cam 65 locks into place in the groove 42 and blocks the support 22 in the tilted position in that the end surface 67 of the extension 64 is approximately parallel to the surface 41. Therefore, the projection 53 of the embodiment according to FIGS. 2 and 4 is superfluous.

We claim:

1. In an actuating device for tilting a component from a locked initial position into at least one tilted position, wherein the component is seated so as to be pivotable around an axle of a frame, and wherein, for tilting the component, at least one actuating rod unlocks a locking device and tilts the component, the improvement wherein:

the actuating device comprises two resilient yokes each having a first end secured to the component and a second end displaceable within defined limits with respect to the components; and a separate actuating rod articulated adjacent to the second end of each yoke wherein each yoke includes a latch cam between the two ends, and the two yokes are arranged axisymmetrically to an axis normal to a longitudinal direction of axle, with the two cams forming a groove into which a projection fixedly connected to the frame is locked in the initial position of the component.

2. The device according to claim 1, further including supports to which a respective one of the yokes is secured and to which the component is secured, the supports each being seated on the axle so as to be rotatable.

3. The device according to claim 1, wherein the yokes and/or the projection are/is made of plastic material.

4. The device according to claim 1, wherein each yoke is bow-shaped between the first end and the latch cam.

5. The device according to claim 4, wherein each yoke additionally includes a latching recess which, in the tilted position, locks into place at the projection.

6. The device according to claim 1, wherein each yoke between the first end and the latch cam is embodied, at least in a region of the latch cam, such that the yoke progressively yields resiliently during pivoting of the component from the initial position so that the component automatically pivots back into the initial position, at least at small deflection angles below 10°, when the actuating rod is not stressed.

7. The device according to claim 1, wherein the component comprises a bowl of a carriage of a sorting line.

8. The device according to claim 3, wherein the plastic material comprises one of POM and PA.

9. The device according to claim 2, wherein each support has an elongated hole extending approximately in a longitudinal direction of the actuating rod on one side of the axle and at a distance from the axle, through which hole extends a journal of the actuating rod of the other yoke.

10. The device according to claim 2, wherein each yoke is elastic to bending adjacent to its first end and is connected in one piece with respectively one support.

11. In an actuating device for tilting a component from a locked initial position into at least one tilted position, wherein the component is seated so as to be pivotable around an axle of a frame, and wherein, for tilting the component, at least one actuating rod unlocks a locking device and tilts the component, the improvement wherein:

the actuating device comprises at least one resilient yoke having a first end secured to the component and a second end displaceable within defined limits with respect to the component; and the actuating rod is articulated adjacent to the second end, the at least one yoke between the two ends includes a latch cam which, in the initial position of the component, locks into place behind a projection fixedly connected to the frame, and wherein the at least one yoke additionally includes a stop which, in the tilted position, locks into place behind the projection and locks the component.

12. In an actuating device for tilting a component from a locked initial position into at least one tilted position, wherein the component is seated so as to be pivotable around an axle of a frame, and wherein, for tilting the component, at least one actuating rod unlocks a locking device and tilts the component, the improvement wherein:

the actuating device comprises at least one resilient yoke having a first end secured to the component and a second end displaceable within defined limits with respect to the component; and the actuating rod is articulated adjacent to the second end, the at least one yoke between the two ends includes a latch cam which, in the initial position of the component, locks into place behind a projection fixedly connected to the frame, and the at least one yoke is connected in an articulated manner adjacent to its first end with the component and the device further includes a spring for prestressing the at least one yoke in a direction toward the projection.

13. In an actuating device for tilting a component from a locked initial position into at least one tilted position, wherein the component is seated so as to be pivotable around an axle of a frame, and wherein, for tilting the component, at least one actuating rod unlocks a locking device and tilts the component, the improvement wherein:

the actuating device comprises at least one resilient yokes having a first end secured to the component and a second end displaceable within defined limits with respect to the component; the actuating rod is articulated adjacent to the second end, the at least one yoke between the two ends includes a latch cam which, in the initial position of the component, locks into place behind a projection fixedly connected to the frame, and wherein the device includes a point lever for supporting an actuating roller, and the actuating rod is connected in an articulated manner with the pivot lever.

* * * * *